July 28, 1959  A. N. OBES  2,896,552

BODY SUPPORTING DOLLY FOR USE IN THE TRANSPORTATION OF FREIGHT

Filed Jan. 24, 1955  7 Sheets-Sheet 1

INVENTOR
Andrew N. Obes
BY
ATT'YS

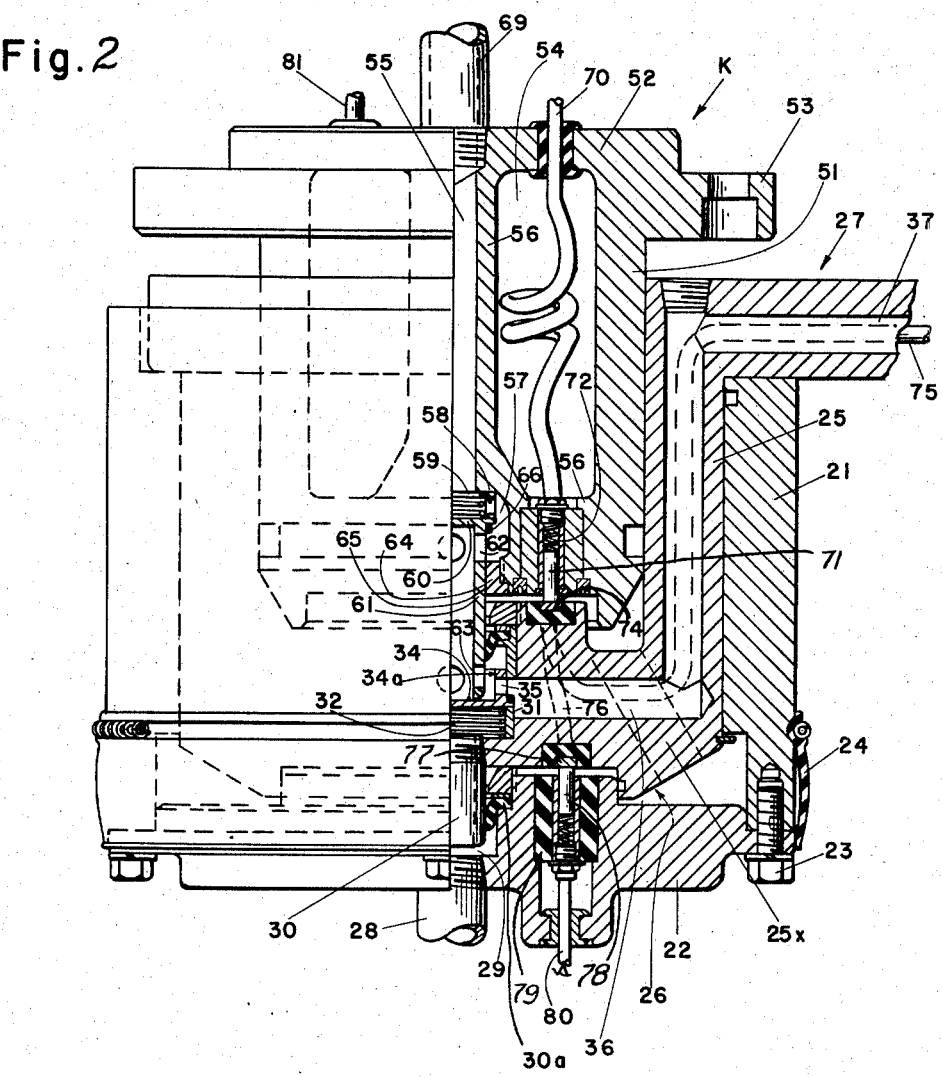

July 28, 1959            A. N. OBES            2,896,552
BODY SUPPORTING DOLLY FOR USE IN THE TRANSPORTATION OF FREIGHT
Filed Jan. 24, 1955            7 Sheets-Sheet 3
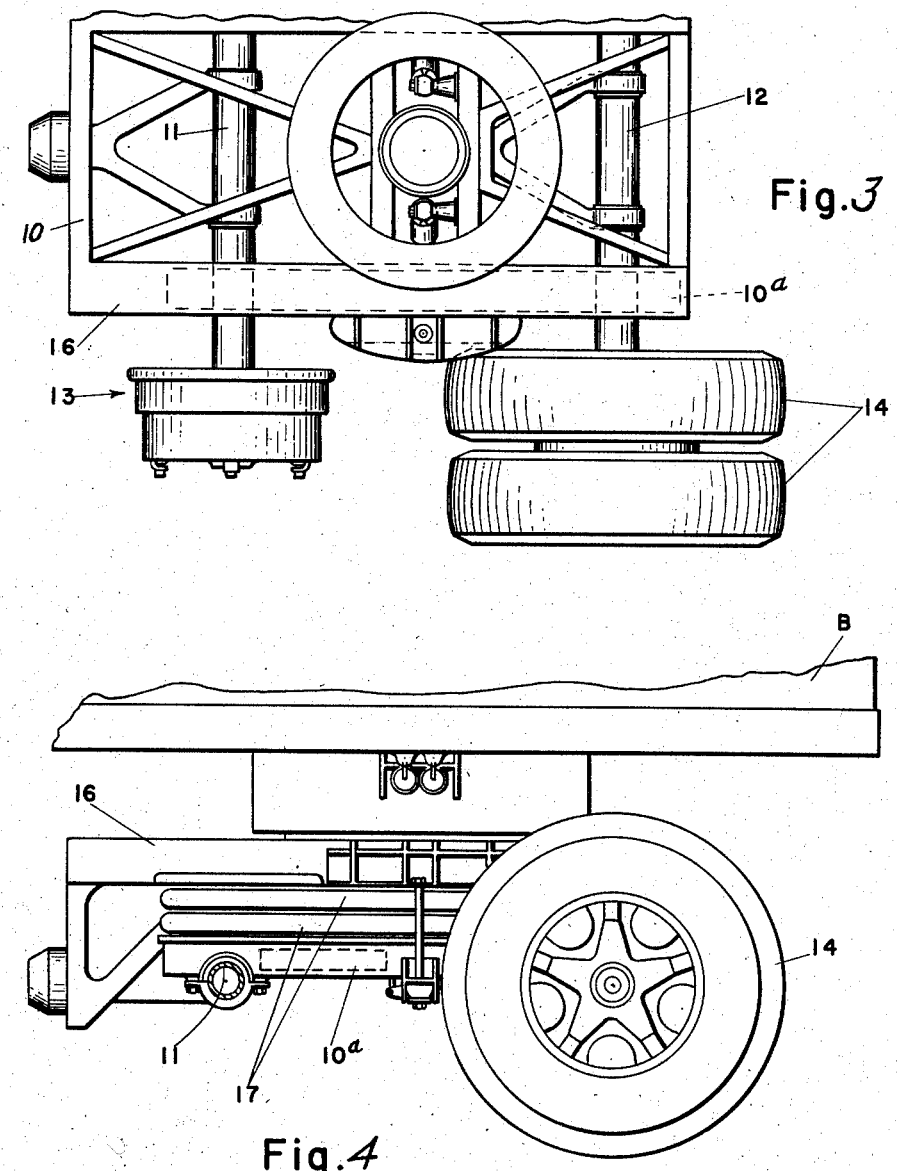
INVENTOR
Andrew N. Obes

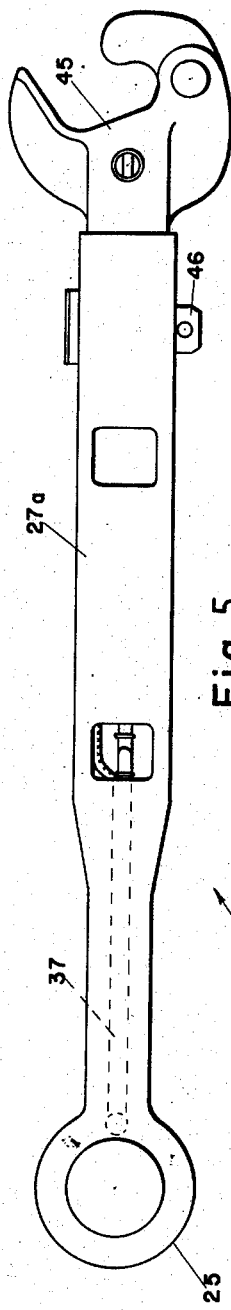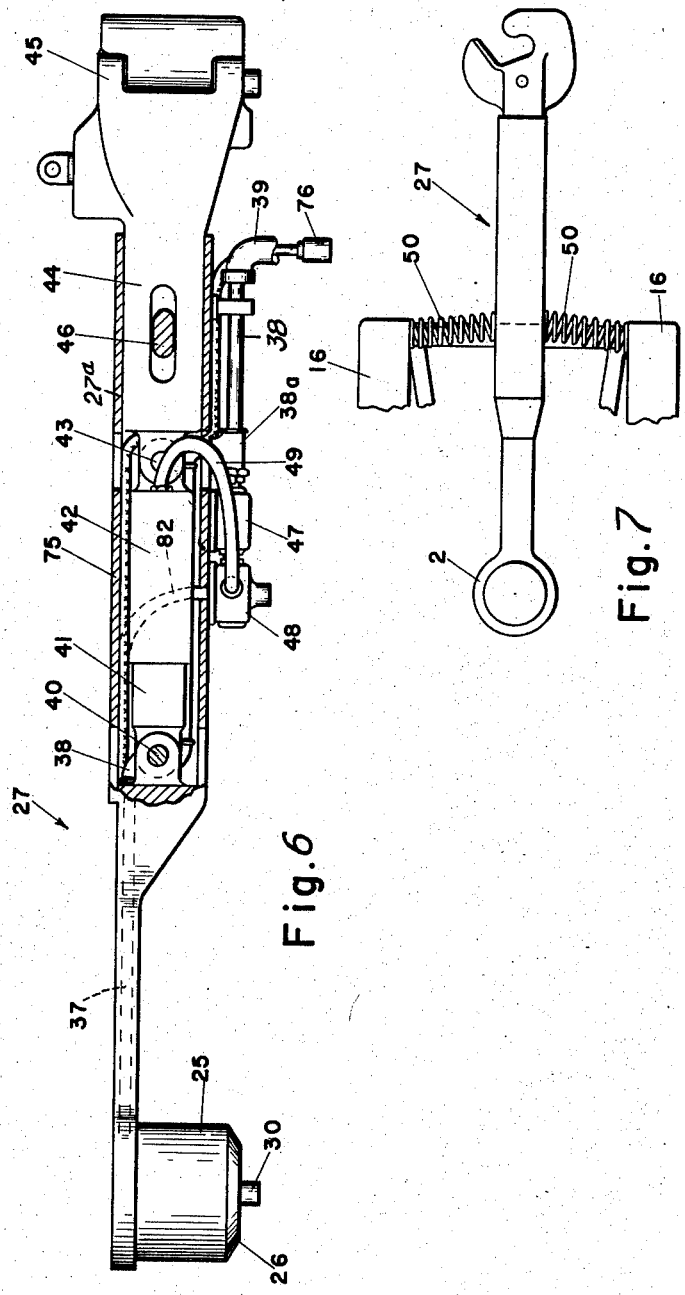

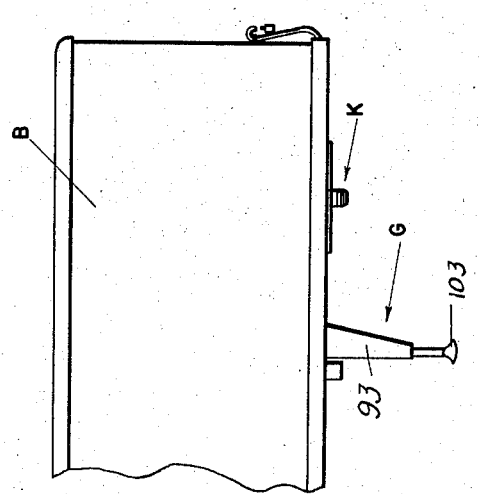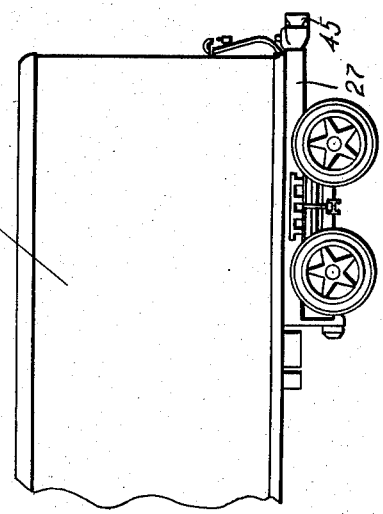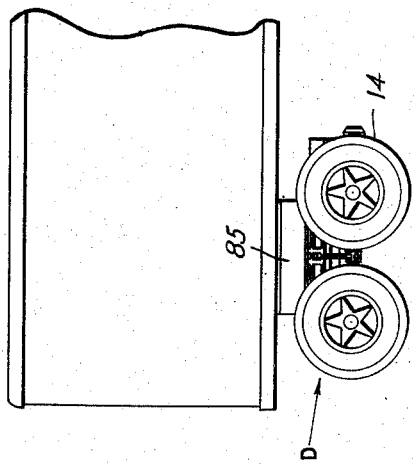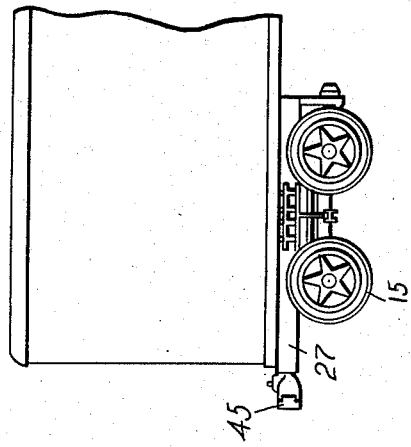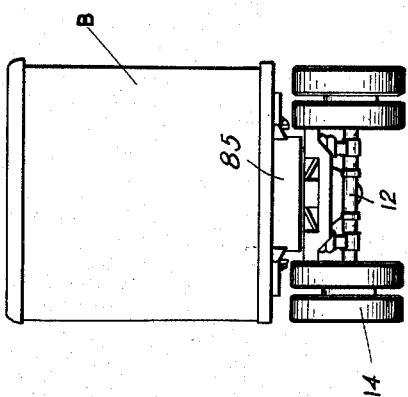

July 28, 1959     A. N. OBES     2,896,552
BODY SUPPORTING DOLLY FOR USE IN THE TRANSPORTATION OF FREIGHT
Filed Jan. 24, 1955     7 Sheets-Sheet 6

INVENTOR
Andrew N. Obes
BY
ATT'YS

INVENTOR
Andrew N. Obes

United States Patent Office 2,896,552
Patented July 28, 1959

2,896,552
BODY SUPPORTING DOLLY FOR USE IN THE TRANSPORTATION OF FREIGHT

Andrew N. Obes, Cambridge, Mass.

Application January 24, 1955, Serial No. 483,541

22 Claims. (Cl. 105—215)

This invention pertains to the transfer of freight and relates more particularly to a novel dolly for supporting a vehicle body while it is being transported over a highway or along a railroad. In the contemplated use of this improved dolly, the body of the vehicle will be provided with kingpins adjacent to its respective ends. When the vehicle is to be conveyed along a highway, one of these kingpins will engage a socket in the dolly of the present invention, the dolly then being provided with wheels adapted to travel along the highway, while the other kingpin will engage a socket in a tractor which may be of generally conventional type. When the vehicle body is to be transported along the railroad its kingpins will engage sockets in two dollies, respectively, each embodying features of the present invention but provided with railway wheels, the vehicle body, resting on its two dollies, thus constituting in effect a railroad car. It is contemplated that the forward dolly of such an assembly may be coupled to the rear dolly of another such assembly and so on, thus constituting a train to which a locomotive may be coupled, the traction force being transmitted from the forward dolly to the rear dolly of such an assembly through the vehicle body alone which for use in the practice of the present invention will be so devised as to be capable of sustaining and transmitting the traction stress regardless of the length of the train.

Obviously each dolly must be provided with brakes and means for actuating the brakes and since the operation of the brakes must be controlled from the cab of the tractor or locomotive, and since the only connection between dollies is through the vehicle body, the brake-actuating force or control must be transmitted through the kingpins and the sockets in which they are seated. Likewise, any other force, whether mechanical, fluid or electrical which must be transmitted from one dolly to another or from one vehicle body to another of a train must pass through the kingpin and the socket in which it is seated. Furthermore, since the dolly is intended for use in a system of transportation wherein the vehicle body is at times conveyed over the highway and at other times along the railroad, the dolly should be so designed that by a mere exchange of wheels it may be adapted for either use; thus avoiding the necessity of providing dollies of different dimensions or of different construction for the two uses and in this way avoiding excessive cost of production and minimizing the number of dollies which must be kept on hand. Moreover, since the vehicle bodies are transferred from dollies having highway wheels to dollies having railway wheels, the dolly must be so devised as to provide adequate support for the vehicle body and to hold the latter securely so that the vehicle body will not tip off of the dolly while the vehicle is rounding curves, and as respects the dolly which supports the rear of the vehicle while traversing the highway, to prevent the dolly from turning relatively to the vehicle body.

Objects of the invention are to provide a novel vehicle dolly having the above desired characteristics which is rugged and durable, which is readily convertible from highway to railway use; and which, although designed for a particular system of transportation in which vehicle bodies are at times carried over the highway and at other times along the railway, is of more general utility and useful as an element of a vehicle which always travels on the highway or which always travels on the railway, respectively. Other and further objects and advantages of the invention will be pointed out in the following more detailed description and by reference to the accompanying drawings, wherein Fig. 1 is a rear elevation, with parts broken away and with parts in vertical section, that portion of the dolly which is at the left of the vertical center line being shown as equipped with highway wheels and a spaced device for holding the vehicle body at a proper elevation to clear the highway wheels; while that portion of the dolly which is to the right of the vertical center line is shown as equipped with railway wheels and without the spacer so that the vehicle body rests directly upon the dolly;

Fig. 2 is a fragmentary vertical section to larger scale than Fig. 1, showing the socket portion of the dolly with one end of a coupler, for connecting adjacent dollies, seated in the socket and with the kingpin of the vehicle body seated in a secondary socket in the coupler;

Fig. 3 is a fragmentary plan view of the dolly, to smaller scale than Fig. 1, showing it equipped with one set of highway tires;

Fig. 4 is a side elevation of the dolly shown in Fig. 3, omitting the hub of the forward wheel, and showing a fragmentary portion of a vehicle body resting on the dolly;

Fig. 5 is a plan view, to smaller scale, of the coupler by means of which a dolly is connected to a similar coupler carried by another dolly;

Fig. 6 is a side elevation, with parts in vertical section, of the coupler of Fig. 3;

Fig. 7 is a fragmentary plan view, to smaller scale than Fig. 5, showing the coupler together with means intervening between the coupler and the vehicle body to prevent excessive side swing of the parts;

Fig. 8 is a fragmentary side elevation showing a vehicle body supported at its rear end upon a dolly of the present invention, the dolly being equipped with highway wheels, while the forward portion of the body is supported by a retractible landing gear;

Fig. 9 is a rear view of the vehicle shown in Fig. 8;

Fig. 10 is a fragmentary side elevation showing the vehicle body supported at its opposite ends upon dollies provided with railway wheels;

Fig. 11 is a rear elevation of the vehicle shown in Fig. 10;

Figure 1:
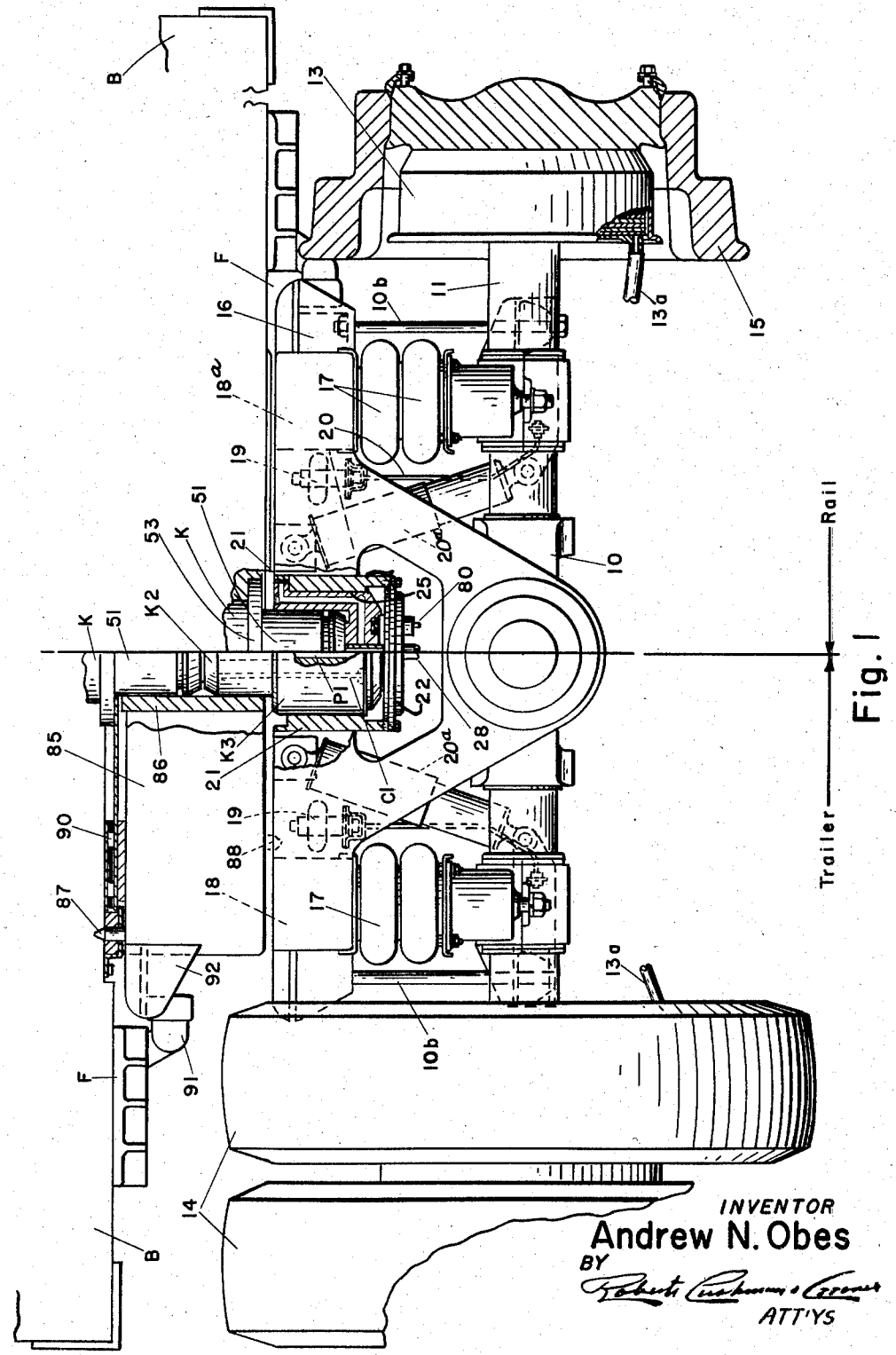

Referring to the drawings and in particular to Figs. 3 and 4, the numeral 10 designates the sub-frame of the dolly. This sub-frame has the front and rear axles 11 and 12 attached to its underside, these axles being hollow, see axle 11, Fig. 4. These axles project out beyond the sides of the sub-frame and at their outer ends carry wheel hubs 13 (Fig. 3) of a type adapted alternatively to carry rims suitable for the mounting of conventional truck tires 14, designed to travel on the highway, or to carry conventional railway wheels 15 (Figs. 1 and 10) designed to travel on a railway track. These hubs house disk-type, fluid actuated brakes of conventional type to which compressed air is admitted through conduits 13ª from a supply tank hereafter described, the delivery of fluid from the supply tank being controlled by electrically operated valves.

The upper frame 16 of the dolly is yieldably supported by air springs 17 (Figs. 1 and 4) of a conventional type, such springs being, in general, similar to pneumatic tires and being supplied with compressed air from a tank 18ª through the intermediary of an auxiliary tank 10ª to keep them inflated at a pressure which may be varied according to the load to be carried. Desirably, in accordance with the present invention, the upper frame 16 is hollow or provided with hollow portions as indicated at 18, 18ª (Fig. 1), constituting air tanks, the sub-frame also having chambers therein to constitute the auxiliary tanks 10ª, the undersides of these air tanks resting upon the air springs 17, and with automatically acting valves 19 controlled by the stabilizer rods 20 and designed automatically to vary the pressure in the air springs at the right and left hand sides, respectively, of the dolly, thereby to maintain the truck body substantially level under all conditions of use. Desirably, motion-limiting rods 10ᵇ (Fig. 1) connect the upper frame 16 with the sub-frame 10, to prevent undue rocking of the upper frame relatively to the sub-frame but without interfering with the automatic leveling operation of the air springs. Conventional shock absorbers 20ª may be provided between the sub-frame and upper frame.

At its midpoint, the upper frame 16 is provided with a downwardly directed, rigid sleeve member 21 (Figs. 1 and 2), whose axis is vertical and which is open at its upper end but which is closed at its lower end by a removable plate 22 (Fig. 2), connected to the sleeve member by bolts 23 and preferably with a weather-seal member 24 covering the joint between the cover and the lower edge of the sleeve 21. The cylindrical cavity within the sleeve member 21 and above the bottom member 22 provides a socket designed to receive, with a swiveling fit, the downwardly directed, cylindrical hollow head 25 of a coupling 27 (Figs. 5, 6 and 7) when the dolly is to be used on a railroad track, or alternatively to receive the lower portion of an auxiliary kingpin K², K³ (Fig. 1) when the dolly is to be equipped with highway wheels.

Desirably the lower part of the member 25 is beveled at 26 to facilitate its entrance into the interior of the sleeve member 21. The bottom plate 22 is provided at its center with a screw-threaded opening which receives an air pipe 28 which opens into a central cavity 29 in the upper surface of the plate 22, the cavity receiving the lower end of a nipple 30 having screw-threaded engagement with a central bore in the lower wall 25ˣ of the head 25 of the coupling. A resilient annular packing 30ª within the cavity 29 is designed to make an air tight seal with the nipple 30 when the latter is pushed downwardly into the cavity 29.

The lower wall 25ˣ of the member 25 is provided with a central recess in its upper surface, coaxial with the nipple 30, which receives an annular seat member 31 which houses a coiled compression spring 32 upon which rests the bottom 34 of a shallow cup-like automatic valve 34ª, the marginal portion of this bottom 34 normally resting upon the seat 31. The cup-like valve comprises an upstanding ring or flange portion having ports 35 which at times open into a cavity 36 in the lower wall 25ˣ of the head 25 of the coupling. This cavity 36 communicates with a horizontal passage 37 (Fig. 5) in the coupling 27. At its right-hand end, as viewed in Figs. 5 and 6, the passage 37 communicates with a pipe 38 (Fig. 6) which is housed within the elongate hollow main portion 27ª of the coupling member, this portion being in the nature of a box girder and strong and rigid enough to withstand the tension and compression stresses to which it is subjected when the dolly is coupled up with another in the formation of a railway train. The pipe 38 leads to a connector 39 of the conventional form used in railway trains for connecting the air brake line of one car to another.

A transverse pivot member 40 (Fig. 6) anchors one end of a piston 41 to the side walls of the coupling member, the piston sliding in a cylinder 42 housed within the part 27ª of the coupling. The opposite end of the cylinder 42 (which is slidable within the coupling) is pivotally connected at 43 to a longitudinally slidable portion 44 of a draw bar having a conventional railroad car coupling 45 at its opposite end. This draw bar 44 is longitudinally slotted to receive a transverse stop member 46, whose ends are fixed in the side walls of the coupling and which limits longitudinal motion of the draw bar relatively to the coupling. In the event that the fluid pressure within the cylinder 42 is insufficient to withstand the longitudinal shocks to which the coupling is subjected, the member 46 (bearing against the end of the slot in the draw bar) will form a mechanical connection sufficiently strong to carry the imposed stresses. Compression springs 50 are interposed between portions of the upper frame 16 of the dolly and the coupling (as shown in Fig. 7) thereby yieldingly to limit swinging motion of the coupling about the axis of the head 25 and to keep the coupling normally aligned with the longitudinal axis of the dolly thereby to facilitate the operation of coupling one dolly to another. The cylinder 42 is also useful when transferring the truck body from highway to railway use. If for example, the next truck, already on railway wheels, is too close to permit the coupling of the body being transferred to move to proper position, the air may be exhausted from cylinder 40, thus permitting a variation in the effective length of each coupling of approximately three inches. The trailer body B (Figs. 8, 9, 10 and 11) is provided near each end with a downwardly directed king-pin K, Fig. 8, and with a centrally located socket (not shown) to receive an upstanding kingpin forming part of a transfer dolly by means of which the truck body may be shipped from one set of wheels to another. Only one of these kingpins K shows in Fig. 8 the corresponding kingpin, near the opposite end of the truck body, being seated in the pin-receiving socket of the dolly D. The axes of the two kingpins are spaced equally from the opposite ends of the truck body and at a suitable distance from the respective ends to insure the proper location of the dollies with reference to the truck body. Each kingpin K is oversize, as compared with the kingpins customarily provided on truck bodies, since the kingpin K may be required to sustain a shearing stress imposed by the traction force exerted in pulling a long train of connected trucks, and each kingpin K, as illustrated in Fig. 2, is a hollow casting comprising a cylindrical body portion 51 closed at its upper end by the integral top wall 52 and having a peripheral flange 53 having holes for the reception of bolts, wherein the kingpin structure may be securely anchored to the bottom of the truck body. As shown in Fig. 2, the kingpin K is provided with an annular interior chamber 54 which is separated from an axial passage 55 by a tubular septum 56 integral with the top wall 52, and which extends downwardly nearly to the lower end of the kingpin, and which is connected near its lower end to the outer wall of the kingpin by a web 56. The lower part of the passage 55 is abruptly enlarged as shown in 57, thereby providing a radial, horizontal shoulder 58 against which bears the upper end of a coiled compression spring 59, which is normally housed in a shallow cup having an apertured wall and a horizontal bottom 60 on which the lower end of the spring rests, the cup being integral with the cylindrical wall 61 of an automatic valve device, this wall 61 having ports at 62 and 63 near its upper and lower ends. At its lower part the septum 56 supports an annulus 64 provided, at 65, with a cylindrical bearing surface with which the outer surface of the cylindrical valve member 61 has sliding contact. A resilient, annular sealing member 66 surrounds the cylindrical wall 61 of the valve and is designed, at times, to engage the upper surface of the part 64 to form sealing contact therewith. The axial passage 55 within the septum 56 communicates at its upper end with a pipe 69 whose lower end has screw-threaded engagement with the top wall 52 of the kingpin, this pipe 69 being designed to convey air to the actuating cylinders of the landing gear, hereafter described, while the pipe 28 which leads downwardly from the lower wall of the coupling 25 is designed to supply air to the wheel brakes.

When the parts are in the position shown in Fig. 2 with the head 25 of the coupling seated in the socket member 21, and with the kingpin K seated in the cavity in the head member 25, the valves 61 and 34ᵃ occupy the positions shown in Fig. 2 so that air can flow through the ports 35 and 63 into the interior of the valve 61 and likewise through the port 62 from the chamber 57 into the interior of the valve 61. The passage 37 in the part 27ᵃ of the coupling is thus in communication through the pipe 28 with the brake system and through the pipe 69 with the interior of the trailer body and, when the proper control valves are open, with the cylinders which operate the landing gear. If the kingpin K is moved upwardly out of the socket in the part 25 of the coupling member, the spring 59 is then enabled to move the valve member 61 downwardly relative to adjacent parts of the kingpin, thus moving the port 62 so that it comes opposite to the surface 65, the port thus being closed and at the same time bringing the resilient seating ring 66 into contact with the upper surface of the part 64, thus preventing air from escaping downwardly through the pipe 69 and the passage 55, from storage tanks in the trailer body or from the cylinders of the landing gear. If the head 25 of the coupling is now withdrawn from the receptacle 21 of the dolly, the valve 34ᵃ will be lifted by its spring 32, thus closing the port 35 and preventing the leakage of air outwardly from the passage 37 in the coupling.

It is preferred to provide the wheels of the dolly with fluid-actuated brakes and to control these brakes electrically. In order to provide for such electrical control of the brakes it is necessary that the brake control switch be located within the trailer cab or in the locomotive if the trailer be mounted upon railway wheels. For this purpose an electrical conductor 70 is arranged to extend down through an insulated bushing in a hole in the part 52 of the kingpin and down through the chamber 54 and with its conducting wire connected to a brush 71 mounted to slide in an insulated sleeve 72 housed in the lower end of the kingpin. The lower end of the coupling member 25 is provided with an annular contact member 74, suitably insulated, with which the brush 71 contacts when the kingpin and coupling member are assembled. From the annular contact member 74 a cable 75 (Fig. 2) extends upwardly through the coupling 27 and through the passage 37 in the latter and terminates at a plug 76 (Fig. 6) designed to engage a complemental socket carried by the next coupling member. From the annular contact 74 another cable 76 extends downwardly to another annular insulated contact 77 mounted in the lower end 25ˣ of the part 25 of the coupling, and this contact member is engaged by a brush 78 mounted in an insulated sleeve 79, fixed in the lower head 22 of the dolly receptacle. A cable 80 extends downwardly through an insulated bushing in the part 22, its conducting wire being connected to the motor means which actuates the valves which admit air to the brake cylinders. Another electrical conductor 81 (Fig. 2) similar to the conductor 70 and which leads to a brush similar to the brush 71 provides for the transmission of electrical energy to a second cable, similar to the cable 75, leading to the coupling device and which as shown at 82, Fig. 6, leads to a motor device for controlling the valve 48 which determines the admission of air to the coupler cushioning cylinder 42.

In the above description of the kingpin and its associated parts with reference to Fig. 2 of the drawings it has been assumed that the dolly is provided with railway wheels as shown in Figs. 10 and 11. At the right-hand side of Fig. 1 this arrangement is also illustrated, it being noted that the floor F of the vehicle body is disposed with but slight clearance above the flange of the railway wheel 15. Since the wheels used on a highway are of larger diameter than the railway wheels it becomes necessary, when transferring the vehicle body to a dolly designed to travel on the highway, that some provision be made for raising the floor of the vehicle body to a higher level in order to provide clearance between the floor and the vehicle tires. For this purpose a spacer device 85 (left-hand side of Fig. 1) is provided, this spacer device being of a vertical height such that when interposed between the floor of the vehicle body and the top of the dolly it will provide the desired clearance between the floor and the highway wheels. This spacer comprises a cylindrical member 86 providing a socket designed to receive the kingpin K and which also receives the upper part of an auxiliary kingpin K², K³ whose lower portion K³ fits directly within the socket 21 of the dolly taking the place of coupler head 25 as shown in Fig. 2. The part K², K³ is a hollow casting having a central air passage P¹ and chambers through which electrical conductors C¹ may pass and is provided at its upper end with an insulated conducting ring (not shown) like the ring 74 above described, and at its lower end with an insulated conducting ring (not shown) like the ring 77 above described, so that when the lower end of the kingpin K rests upon the upper end of the part K², (the latter being seated in the socket 21) an uninterrupted passage is provided from the trailer body to the pipe 28 and likewise electrical connections are provided leading from the trailer body, through the conductor 70 and the conductor 80, through which electrical impulses may be transmitted to the brake controlling motors. The spacer member 85 is provided with pins 87 and 88 which engage sockets in the floor of the trailer body and in the upper member 16 of the dolly, respectively, thereby to prevent relative rotation of the trailer body and dolly about the vertical axis of the kingpin when the trailer body is mounted on the dolly provided with highway wheels.

Desirably, the underside of the trailer body floor is provided with a suitable wear plate 90 (Fig. 1) having inserted rollers for contact either with the upper surface of the spacer member 85 or with the upper surface of the dolly proper, according as the body is mounted upon a dolly having road wheels or railway wheels. In order to prevent the body from tilting sidewise when mounted upon the highway wheels, suitable locking means, indicated generally at 91, Fig. 1, are provided, such locking means desirably being actuated by air pressure and comprising latch means carried by the vehicle body and which may be engaged with complemental parts 92 carried by the spacer 85. Such locking means may take various forms and may be of conventional type so that it is unnecessary to describe them in detail.

Figure 13:
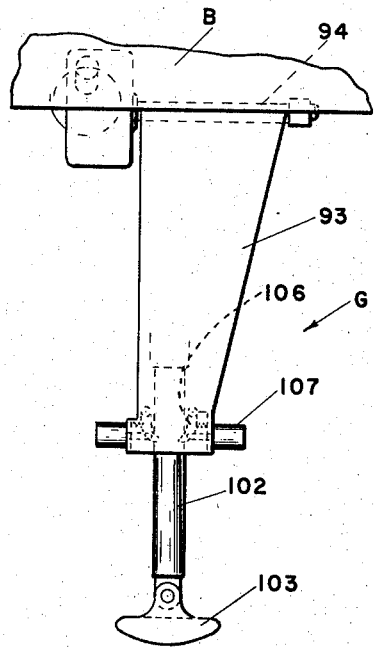
Fig. 13 is a rear elevation of the parts shown in Fig. 12.
Figure 12:
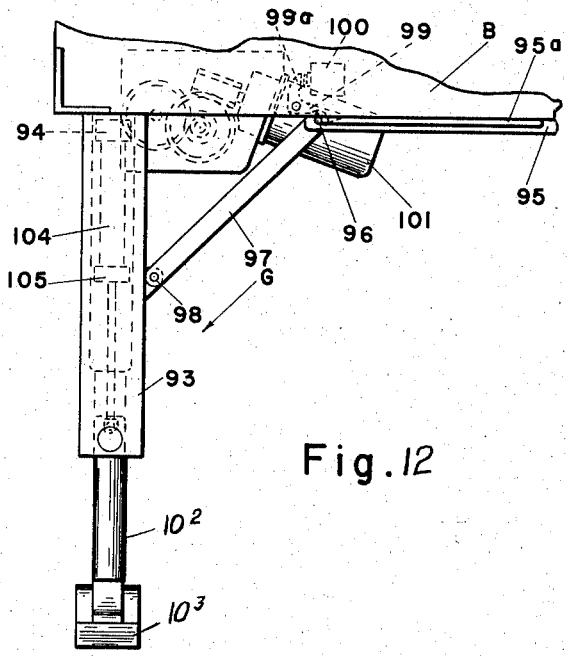
Fig. 12 is a side elevation of a desirable form of retractible landing gear and showing a fragmentary portion of the vehicle body to which said landing gear is attached.
Figure 14:
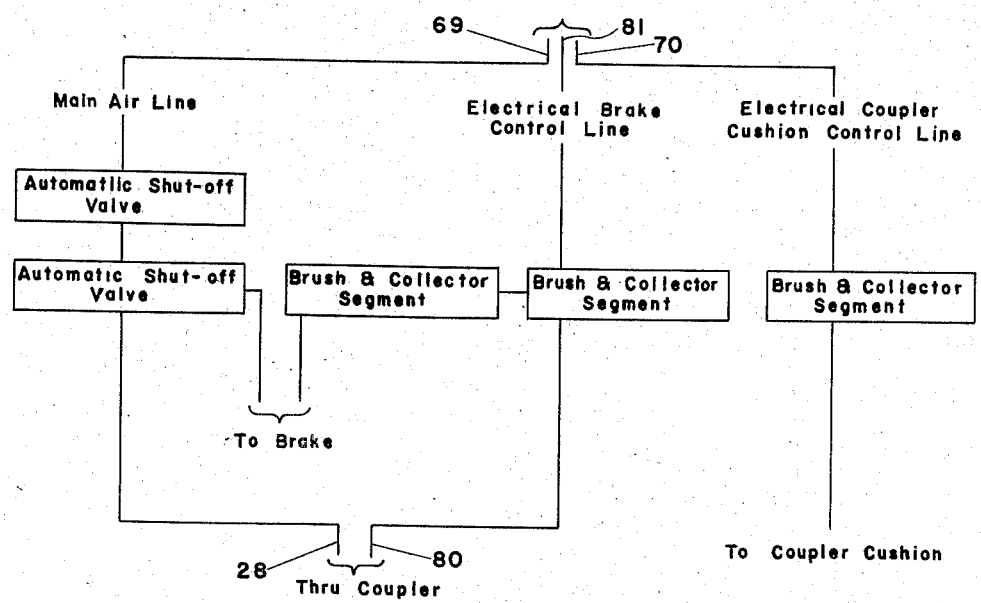
Fig. 14 is a diagram illustrative of certain air supply and electrical connections between the vehicle body and the dolly when the vehicle body is mounted directly on the dolly and the latter is provided with railway wheels.
Figure 15:
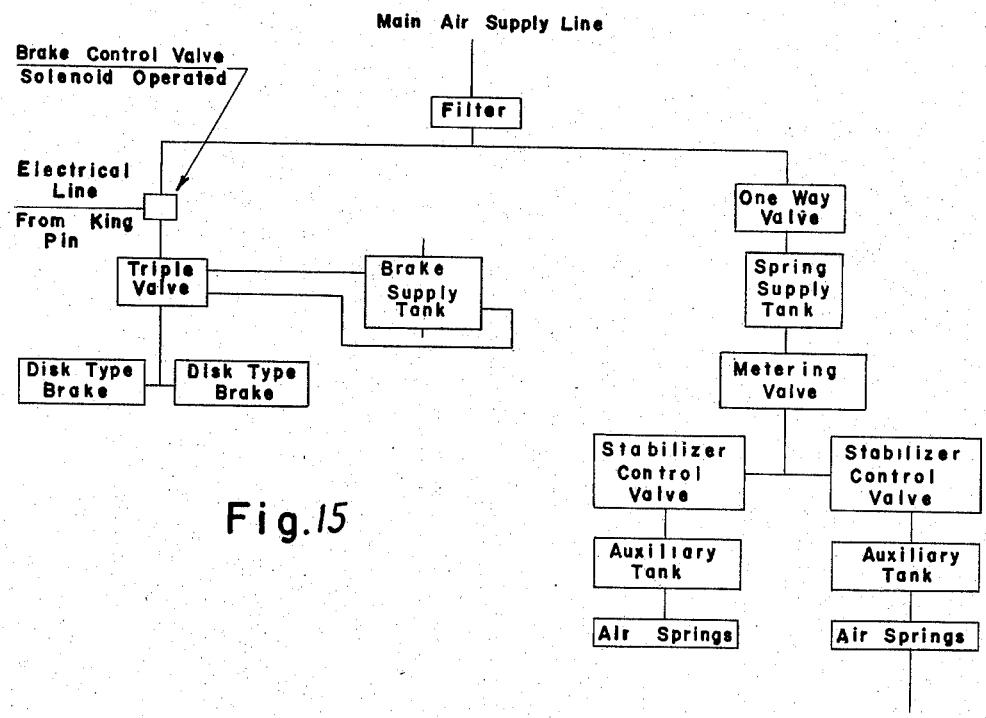
Fig. 15 is a similar diagram illustrative of other of the connections for supplying air and electrical current between the vehicle body and the dolly when the body is mounted upon a dolly provided with highway wheels.
Figure 16:
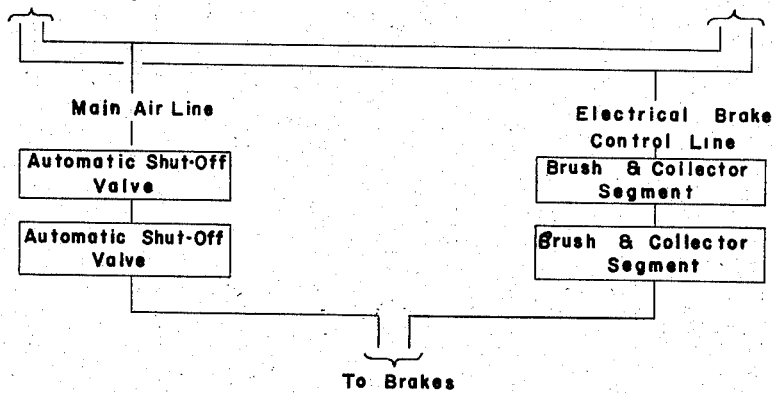
Fig. 16 is a diagram illustrative of the electrical and air supply connections between the tractor cab and the tractor body.

The vehicle body B is provided, as illustrated in Figs. 8, 12 and 13, with retractable landing gear designed to support the forward end of the body when the latter has been disengaged from the road tractor. The landing gear comprises duplicate mechanisms located at opposite sides respectively, of the vehicle body, and it is thus necessary to describe but one of them. Thus, as shown in Figs. 12 and 13, each landing gear comprises a vertical rigid strut 93 pivotally connected at 94 to the vehicle body so as to be capable of swinging transversely of the truck body. A guide member 95, fixed to the underside of the vehicle body, has an elongate slot 95ᵃ in which a pin 96 is arranged to travel. This pin is connected to the upper end of a brace 97 which is pivotally connected at 98 its lower end to the strut 93. A latch 99 is arranged to engage the pin 96 and hold the latter as shown in Fig. 13 while the landing gear is in the operative position shown in Figs. 12 and 13. The latch 99 has an actuating arm 99a which is engageable at times by a plunger arranged in an air cylinder 100. When this plunger is projected the latch is swung so as to release it from the pin 96, thus allowing the strut 97 to be folded up toward the horizontal position about its pivotal axis 98. For thus moving the strut either upwardly or downwardly there is provided a train of gearing including a worm gear driven by an electric motor 101, the gearing being so designed that it cannot turn backwardly, thus avoiding the possibility that the strut might fold unintentionally.

Since the space beneath the trailer body is somewhat limited, it is desirable, in order to provide a landing gear of the right height, to provide the strut with an extension member 102, here shown as having a freely rocking ground-engaging foot 103 at its lower end. The extension member 102 is arranged to slide within an air cylinder 104 inside the hollow strut 93, the extension 102 having a piston head 105 which slides in the cylinder so that when air is supplied to the upper end of the cylinder, the piston is pushed down, thus moving the extension 102 downwardly. The extension is provided at its opposite side with rack teeth (not shown) and the strut is provided with pivoted pawls 106 which are designed to engage these teeth and thus hold the extension in operative projected position. For releasing these pawls from the teeth, solenoids 107 are provided which are supplied with current from the trailer body under the control of appropriate switch means. Thus when it is desired to support the forward end of the trailer body on the landing gear, the motor 101 is first energized so as to swing the strut 93 down to the vertical position where it is automatically latched by the latch device 99. Air is then admitted to the cylinder 104, thus projecting the extension 102 downwardly until its foot 103 is in position to contact the ground, the extension being locked in this position by the latches 106. For folding the landing gear, the reverse operation is caused to take place.

It is contemplated that the trailer body may for example be of the order of 35 feet in length, weighing a maximum of 12,000 pounds and carrying a load of 60,000 pounds. Such a trailer body may be of the so-called monocoque construction, comprising seamless inner and outer metallic shells or possibly shells of an appropriate synthetic plastic reinforced with fiberglass, with the space between the shells filled with a cellular material which not only imparts rigidity to the structure but which also provides a body having insulating characteristics such that the trailer body may be employed for the transportation of refrigerated freight. It is also contemplated that the interior of the trailer body may be divided, if desired, into compartments either by permanent or movable partitions, and that if desired these compartments or some of them may have an impervious flexible lining, for example, of one of the synthetic resins, so that liquid in bulk may be transported in such a lined compartment. Obviously, the trailer body must be sufficiently strong to resist both compressive and tensile stress to enable it to transmit the shocks and traction pull to which it is subjected when, for instance, it is the first of a long series of truck bodies coupled to form a train.

By the use of the air spring 17 above referred to, it is possible, by adjusting the air pressure, to raise or lower the vehicle body. This adjustment may be accomplished automatically by means of the stabilizer actuating rods and control valves, thus maintaining a constant trailer height regardless of the load. Likewise side sway of the trailer is resisted, since lowering of one side of the trailer causes the stabilizer valve to operate, thereby to increase the air pressure in the spring on the lowered side and thus tending to return the trailer to level position. As above described, it is preferred to employ air brakes but to actuate these brakes electrically. For this purpose it is proposed to employ the standard triple valve such as is used in air brake systems, an electrically operated release valve and an air supply tank in the trailer body. In the normal application of the brakes the electrical switch would be closed, thereby to close the main line through the release valve, and thus relieve pressure between the release valve and the triple valve. The triple valve would then operate to close the main line and open the air supply tank to the brakes themselves. A disk type of brake, as proposed, is regarded as most desirable because it presents a large braking surface and cooling area and requires no separate activating piston.

For highway operation each truck body would be provided with a suitable socket to receive a plug for supplying current from the highway tractor to the various lights, direction signals, etc. of the truck, thereby avoiding the necessity for carrying conductors for such devices through the kingpin.

A contemplated use of this dolly is substantially as follows. A loaded tractor trailer unit would be driven to a terminal where the operator would park the vehicle in a specified position. When in this position the operator would be able to set the brakes on the trailer road-dolly, lower the trailer landing gear and disengage the tractor from the trailer kingpin without leaving the cab. Following this operation, a transfer dolly would move beneath the trailer, unlock the road-dolly from the trailer body, lift the trailer body clear of the road-dolly, disengaging all connecting lines, and retract the landing gear. The trailer body would then be moved horizontally until its kingpins were directly above the sockets of two spaced rail dollies and lowered into position. This would engage the trailer body kingpins with the rail dolly sockets, completing all necessary connections for rail operation, including locking the two rail dollies to the trailer body. A train so made up would then be pulled to another transfer terminal where the above process would be repeated in reverse. Because the same dolly may be employed for railway or highway transportation, depending merely upon the type of wheel which may be used at any time, a substantial economy results, first because all of the dollies may be made to the same pattern and dimensions, and second, because from a given stock of dollies the required number may, at any given time, be allocated to railway or highway use, the relative proportions of the total stock reserved for these uses varying with particular conditions and demand. However, the number of wheels to be exchanged from dolly to dolly, in accordance with this procedure, would normally be far less than though the wheels of all vehicles would require to be changed each time they arrived at a transfer station.

While certain desirable constructions have herein been described and illustrated by way of example, it is to be understood that the invention is broadly inclusive of any and all modifications falling within the scope of the appended claims.

I claim:

1. Apparatus for use in transporting goods from a shipping point to a distant destination by the use of highway and railway, said apparatus comprising an elongate goods container having a kingpin adjacent to each of its ends respectively, but which is devoid of permanently attached wheels, a plurality of independent dollies all of identical construction and each having spaced axles provided with hubs designed alternatively to receive conventional truck wheels for travel along the highway or conventional railway wheels for travel on a railway track, each dolly having a socket designed to receive one of the kingpins of the container, said container, having its kingpins seated in the sockets of two of said dollies, respectively, when each of said dollies is provided with railway wheels, constituting a railway car body, wherein the container forms the sole connection between the dollies, the container being of such strength and rigidity as to be capable of sustaining the maximum traction force imposed when a plurality of railway cars, so constituted, are coupled together in series to form a train, said container with its spaced kingpins being operative to constitute the body of a truck for highway travel when, instead of having its kingpins seated in the sockets of dollies equipped with railway wheels, one of said kingpins is seated in the socket of such a dolly equipped with highway wheels instead of railway wheels while its other kingpin is seated in an appropriate socket provided in a power-driven tractor, designed for highway use, the container then constituting the only connection between the last-named dolly and the tractor.

2. Apparatus according to claim 1, wherein each dolly comprises a frame provided with front and rear axles, a rigid cylindrical vertical sleeve member carried by the frame, said sleeve member being open at its top and provided with a bottom closure and defining a socket cavity operative to receive the kingpin of the vehicle body in coaxial relation when the body and dolly are assembled, and means for transmitting traction force from the socket-forming sleeve to the kingpin.

3. A dolly according to claim 2, wherein the means for transmitting traction force from the socket-forming sleeve to the kingpin comprises a coupler having a hollow head portion of such external dimensions as to provide for an easy turning fit of said head within the socket cavity of the dolly, said hollow head having an interior chamber shaped to receive the kingpin.

4. A dolly according to claim 3, wherein the coupler comprises a part designed for connection to a similar coupler attached to another dolly, thereby to couple the dollies together.

5. A dolly according to claim 3, wherein the coupler comprises an elongate, hollow main portion rigidly joined to the head portion, a rigid draw bar slidable within the elongate hollow main portion of the coupler, and a yieldable connection between the draw bar and the main portion of the coupler.

6. A dolly according to claim 5, wherein the yieldable connection between the dolly and the main portion of the coupler comprises a cylinder mechanically connected to the draw bar, a piston slidable within the cylinder, means connecting the outer end of the piston to the main portion of the coupler, and means for supplying pressure fluid to the interior of the cylinder.

7. A dolly according to claim 5, wherein the yieldable connection between the dolly and the main portion of the coupler comprises a cylinder mechanically connected to the draw bar, and means for supplying pressure fluid to the interior of the cylinder, an electrically actuated valve for controlling the supply of pressure fluid to the cylinder, and an electrical conductor which extends from said valve to the interior of the head portion of the coupler.

8. A dolly according to claim 6, wherein the draw bar has an elongate slot, and a rigid stop member, fixed to the main portion of the coupler, passes loosely through the slot thereby limiting relative motion of the draw bar and coupler.

9. Apparatus according to claim 1, wherein each dolly has a frame having front and rear axles mounted therein, a rigid cylindrical sleeve member, whose axis is vertical, carried by the frame, said sleeve member being open at its top and having a bottom closure thereby defining a socket cavity, a vehicle body having a downwardly directed kingpin designed to be disposed in coaxial relation to and within said socket cavity, and means providing for the uninterrupted flow of pressure fluid from the vehicle body through the kingpin and the bottom closure of the socket cavity when said parts are assembled.

10. In combination with a vehicle body having a downwardly directed kingpin, a dolly comprising a frame having front and rear axles mounted therein, the frame supporting a rigid cylindrical sleeve member whose axis is vertical and which is open at its top and having a bottom closure thereby defining a socket cavity for the reception of said kingpin, and means providing an uninterrupted electrical conductor from the interior of the trailer body through the kingpin and through the bottom closure of the socket cavity when the parts are assembled.

11. In combination with a dolly comprising a frame having front and rear axles mounted therein, the frame supporting a rigid cylindrical sleeve member whose axis is vertical and which is open at its top and having a bottom closure thereby defining a socket cavity, a vehicle body having a downwardly directed kingpin disposed in coaxial relation within said socket cavity, and means for transmitting traction force between the socket-forming sleeve and the kingpin.

12. The combination set forth in claim 11, further characterized in that the means for transmitting traction force between the socket-forming sleeve and the kingpin is a coupler having a hollow cylindrical head portion of such external diameter as to have an easy turning fit within the socket cavity of the dolly and whose interior is shaped to receive the kingpin.

13. The combination according to claim 12, wherein the head portion of the coupler has a bottom closure provided with a central chamber and a passage leads from said central chamber through the thickness of the wall of the head member of the coupler, the bottom closure of the socket-forming sleeve having a port communicating with said central chamber and the kingpin having a passage designed to communicate with said central chamber.

14. The combination according to claim 13, wherein valve means is provided which is operative to close communication between the passage in the coupler and the socket cavity when the kingpin is removed from the coupler.

15. The combination according to claim 14, wherein valve means is provided which is operative automatically to close the passage in a kingpin when the latter is removed from the coupler.

16. In combination with a vehicle body having a downwardly directed kingpin, a dolly for supporting one end of the vehicle body, said dolly comprising axles having hubs mounted thereon and which are designed for the reception of railway wheels or highway wheels alternatively, the dolly having a socket for the reception of the kingpin which projects downwardly from the floor of the vehicle body, and an electrical conductor extending through the kingpin and which is operative to supply current for the control of brakes.

17. In combination with a vehicle body having a floor and a kingpin which projects downwardly therefrom, a dolly for supporting one end of the vehicle body, said dolly comprising axles having hubs mounted thereon and which are designed for the reception of railway wheels or highway wheels, alternatively, the dolly having a socket for the reception of the kingpin which projects downwardly from the floor of the vehicle body, the parts being so constructed and arranged that, when the kingpin is directly seated in the socket in the dolly, the floor of the vehicle is at a level to provide but slight clearance between the floor and the flanges of railway wheels mounted on the hubs, and means for supporting the vehicle body at a higher elevation when highway wheels are mounted on the hubs, thereby to provide clearance between the floor and the highway wheels.

18. The combination according to claim 17, wherein the means for supporting the vehicle body at a higher elevation, when the highway wheels are in use, comprises a spacer having a socket for the kingpin, and an auxiliary kingpin designed to seat in the dolly socket when the vehicle body is so elevated, said auxiliary kingpin having provision for conducting pressure fluid and electrical current from the kingpin proper to the parts carried by the dolly.

19. A dolly for supporting one end of a vehicle body, said dolly being of the kind having spaced parallel front and rear axles and a hub carried by each axle, said hubs being constructed and arranged to carry rims suitable for the mounting of truck tires, or, alternatively, for carrying wheels adapted to travel on a railway track, the dolly comprising an upper frame arranged above a subframe, in the latter of which the axles are journaled, characterized in having air springs interposed between the upper and sub-frames, one at least of said frames being provided with a chamber for compressed air, and valve means for controlling the flow of air from said chamber to the air springs.

20. A dolly for supporting one end of a vehicle body provided with a downwardly directed kingpin, said dolly having a frame provided with a downwardly directed, rigid sleeve member which is open at its upper end and which defines a socket cavity with which the kingpin is coaxial when the dolly and vehicle body are assembled, a closure for the lower end of said sleeve member, the closure having a downwardly directed well in which is fixed an insulated guide sleeve, a brush contact slidable within said guide sleeve with its upper end disposed within the socket cavity, spring means resiliently urging the brush contact upwardly, and an insulated electrical conductor electrically connected to the brush contact and which passes downwardly through said closure member to the underside of the latter.

21. In combination with a vehicle body having a floor and a kingpin projecting downwardly from the floor near one end of the vehicle body, a dolly for supporting said end of the vehicle body, the dolly having a socket for the reception of the kingpin, the vehicle body floor having a wear plate at its underside surrounding the kingpin, and anti-friction elements interposed between said wear plate and a part of the dolly, means operative to prevent the vehicle body from tipping laterally when mounted on the dolly, and means operative to prevent relative rotation of the vehicle body and dolly about the vertical axis of the kingpin when the highway wheels are in use.

22. In combination with a trailer body having a depending kingpin adjacent to each end respectively, two dollies each having a socket-forming member, two couplers each having a hollow head portion disposed within the socket member of a corresponding one of said dollies, each coupler head having a chamber within which one, respectively of the kingpins of the trailer body is disposed, each coupler having means joining it to a similar coupler attached to another trailer body, the trailer body being so designed as to be capable of sustaining the maximum traction force to which it may be subjected when a plurality of such trailer bodies, each supported by and constituting the sole connection between its supporting dollies, are coupled together to form a train, and conducting means for conveying pressure fluid and electrical energy from the trailer body through its kingpin from one coupler to another.

References Cited in the file of this patent
UNITED STATES PATENTS

| | | |
|---|---|---|
| 2,263,578 | Hickman | Nov. 25, 1941 |
| 2,313,335 | Godfrey | Mar. 9, 1943 |
| 2,709,969 | Andert | June 7, 1955 |